US012580887B2

(12) United States Patent
Bhagra et al.

(10) Patent No.: US 12,580,887 B2
(45) Date of Patent: Mar. 17, 2026

(54) SCALABLE FLOW DIFFERENTIATION FOR NETWORKS WITH OVERLAPPING IP ADDRESSES

(71) Applicant: Palo Alto Networks, Inc., Santa Clara, CA (US)

(72) Inventors: Pankaj Kumar Bhagra, Fremont, CA (US); Sharad Saha, Santa Clara, CA (US); Srinivasan Komandoor Santhanam, Sunnyvale, CA (US); Eswar Rao Sadaram, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 256 days.

(21) Appl. No.: 18/362,537

(22) Filed: Jul. 31, 2023

(65) Prior Publication Data

US 2025/0047640 A1     Feb. 6, 2025

(51) Int. Cl.
H04L 9/40          (2022.01)
(52) U.S. Cl.
CPC ...... H04L 63/0236 (2013.01); H04L 63/0263 (2013.01); H04L 63/20 (2013.01)
(58) Field of Classification Search
CPC . H04L 63/0236; H04L 63/0263; H04L 63/20; H04L 63/0272

USPC .......................................................... 726/11
See application file for complete search history.

(56)              References Cited

U.S. PATENT DOCUMENTS

| | | | |
|---|---|---|---|
| 10,970,380 B2 * | 4/2021 | Hao ..................... | H04W 12/069 |
| 2017/0195394 A1 * | 7/2017 | Kothari ................... | H04L 67/02 |
| 2018/0212909 A1 * | 7/2018 | McCarthy-Howe .... | H04L 51/58 |
| 2021/0266333 A1 * | 8/2021 | Wright ................ | H04L 63/1408 |
| 2021/0409308 A1 * | 12/2021 | Menon ................... | H04L 45/72 |
| 2025/0047640 A1 * | 2/2025 | Bhagra ............... | H04L 63/0263 |

* cited by examiner

*Primary Examiner* — Aubrey H Wyszynski
(74) *Attorney, Agent, or Firm* — Gilliam IP PLLC

(57)              ABSTRACT

Flows corresponding to an overlapping IP address are differentiated via scalable techniques for appropriate enforcement security policies. Agents deployed to each site of a network (e.g., each VPC or branch router) encapsulate outbound packets with a header that includes an identifier that uniquely identifies the site as the origin of the packets, such as a VPC identifier or branch identifier. A session manager executing on a security appliance receives the encapsulated packets and determines the origin identifier and other packet attributes, including source/destination IP addresses, source/destination ports, and protocol. The session manager creates an N-tuple (e.g., a 6-tuple) comprising the origin identifier and packet attributes and creates a session for the flow with the N-tuple as the session key. The security appliance then enforces a security policy for the packets and subsequent packets that are part of the flow and match to the created session.

20 Claims, 5 Drawing Sheets

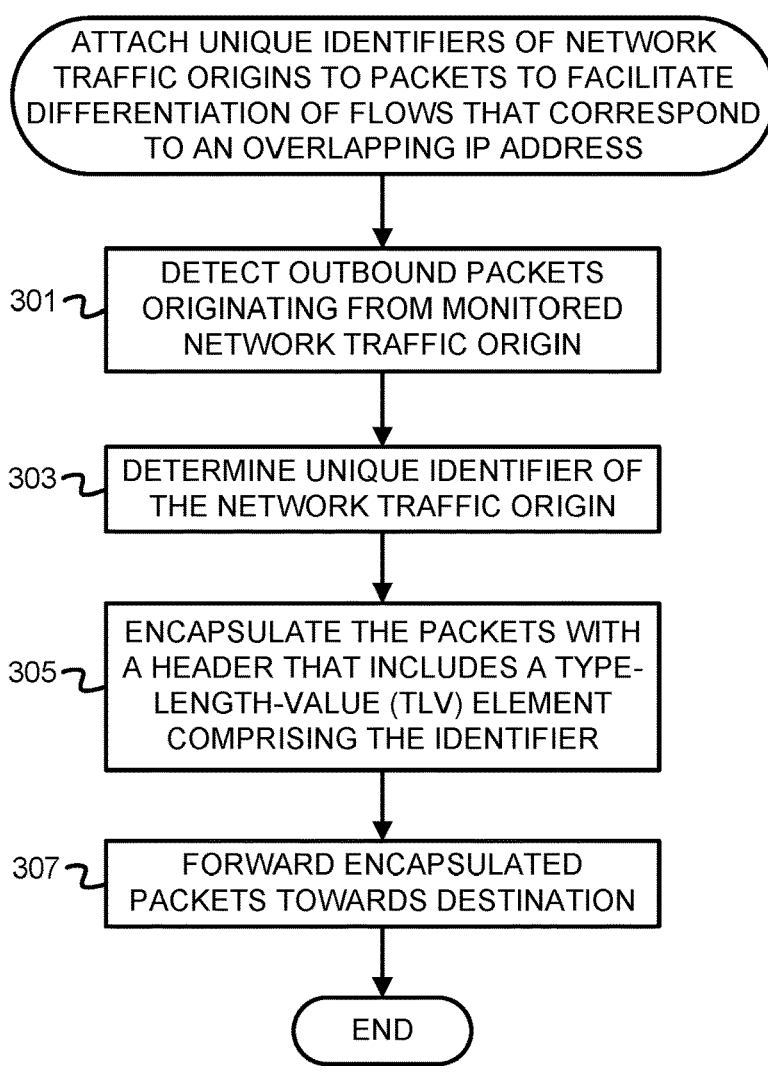

ATTACH UNIQUE IDENTIFIERS OF NETWORK TRAFFIC ORIGINS TO PACKETS TO FACILITATE DIFFERENTIATION OF FLOWS THAT CORRESPOND TO AN OVERLAPPING IP ADDRESS

301 DETECT OUTBOUND PACKETS ORIGINATING FROM MONITORED NETWORK TRAFFIC ORIGIN

303 DETERMINE UNIQUE IDENTIFIER OF THE NETWORK TRAFFIC ORIGIN

305 ENCAPSULATE THE PACKETS WITH A HEADER THAT INCLUDES A TYPE-LENGTH-VALUE (TLV) ELEMENT COMPRISING THE IDENTIFIER

307 FORWARD ENCAPSULATED PACKETS TOWARDS DESTINATION

END

FIG. 3

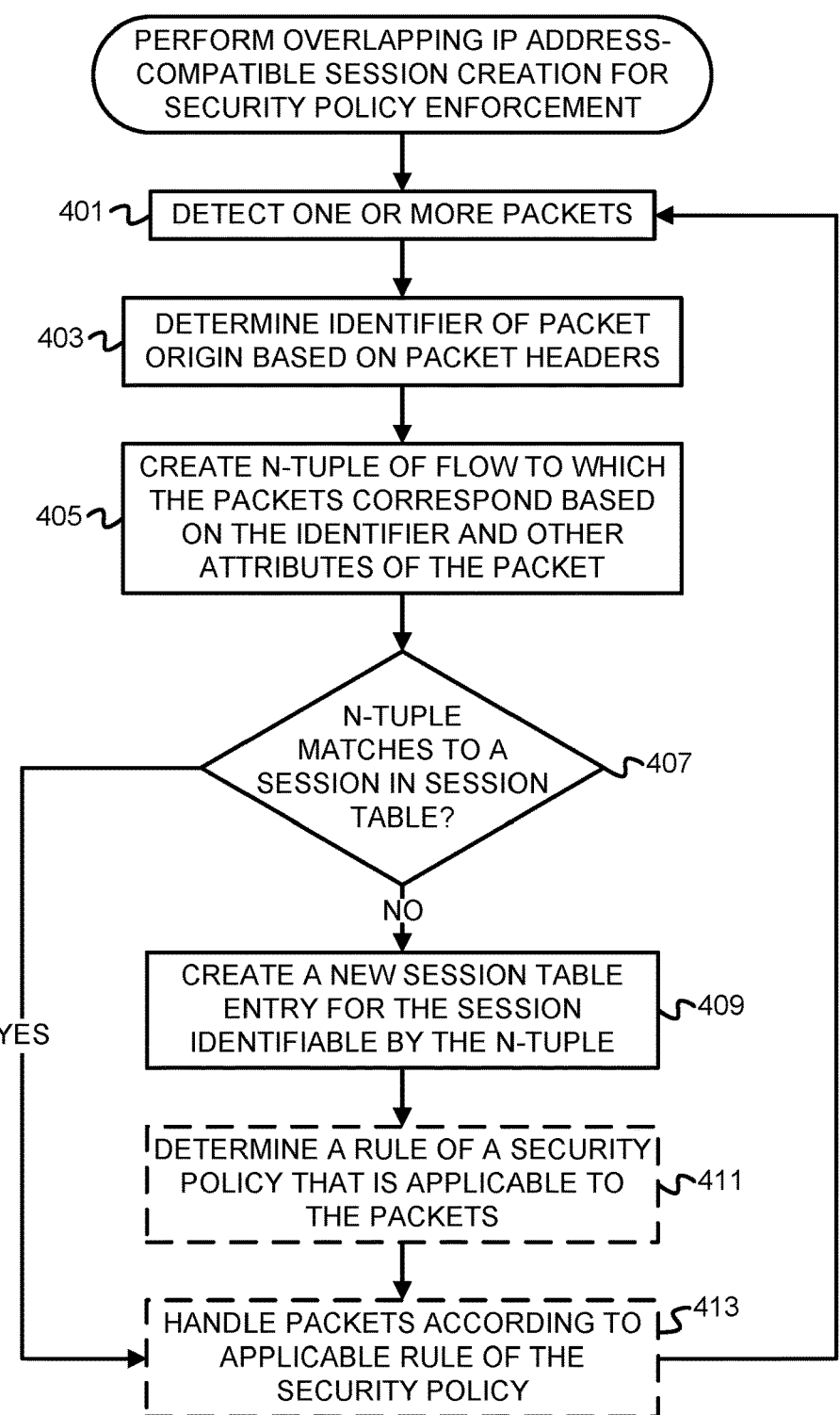

PERFORM OVERLAPPING IP ADDRESS-COMPATIBLE SESSION CREATION FOR SECURITY POLICY ENFORCEMENT

401 — DETECT ONE OR MORE PACKETS

403 — DETERMINE IDENTIFIER OF PACKET ORIGIN BASED ON PACKET HEADERS

405 — CREATE N-TUPLE OF FLOW TO WHICH THE PACKETS CORRESPOND BASED ON THE IDENTIFIER AND OTHER ATTRIBUTES OF THE PACKET

407 — N-TUPLE MATCHES TO A SESSION IN SESSION TABLE?

NO

YES

409 — CREATE A NEW SESSION TABLE ENTRY FOR THE SESSION IDENTIFIABLE BY THE N-TUPLE

411 — DETERMINE A RULE OF A SECURITY POLICY THAT IS APPLICABLE TO THE PACKETS

413 — HANDLE PACKETS ACCORDING TO APPLICABLE RULE OF THE SECURITY POLICY

FIG. 4

SCALABLE FLOW DIFFERENTIATION FOR NETWORKS WITH OVERLAPPING IP ADDRESSES

BACKGROUND

The disclosure generally relates to transmission of digital information (e.g., CPC subclass H04L) and to maintenance, administration, or management of data switching networks (e.g., CPC subclass H04L 41/00).

An overlapping Internet Protocol (IP) address is an IP address that is assigned to more than one device in a network. Overlapping IP addresses can occur in networks with subnets created with the same address blocks (e.g., the same Classless Inter-Domain Routing (CIDR) blocks). Overlapping IP addresses may also result from a merger or acquisition of/between organizations and devices with an overlapping IP address are connected to the merged organizations' or acquired organization's network.

A network traffic flow ("flow") is a sequence of packets sent between two host systems (e.g., client and server). Packets in a flow share a set of properties that is commonly referred to as the 5-tuple, which comprises a source IP address, a destination IP address, a protocol, a source port, and a destination port. Packets with properties that are given by a 5-tuple or its transposition (i.e., with source/destination IP addresses and ports reversed to account for bidirectionality) can be characterized as belonging to the same flow. Security appliances such as firewalls may establish sessions on a per-flow basis. In other words, a firewall session can be created upon detection of a packet(s) that corresponds to a new flow, and packets that match to this flow are subject to the security policy(ies) that the firewall determined to be applicable to the flow.

BRIEF DESCRIPTION OF THE DRAWINGS

Embodiments of the disclosure may be better understood by referencing the accompanying drawings.

FIG. 3 is a flowchart of example operations for attaching unique identifiers of network traffic origins to packets to facilitate differentiation of flows that correspond to an overlapping IP address.

FIG. 4 is a flowchart of example operations for performing overlapping IP address-compatible session creation for security policy enforcement.

DESCRIPTION

Figure 1:
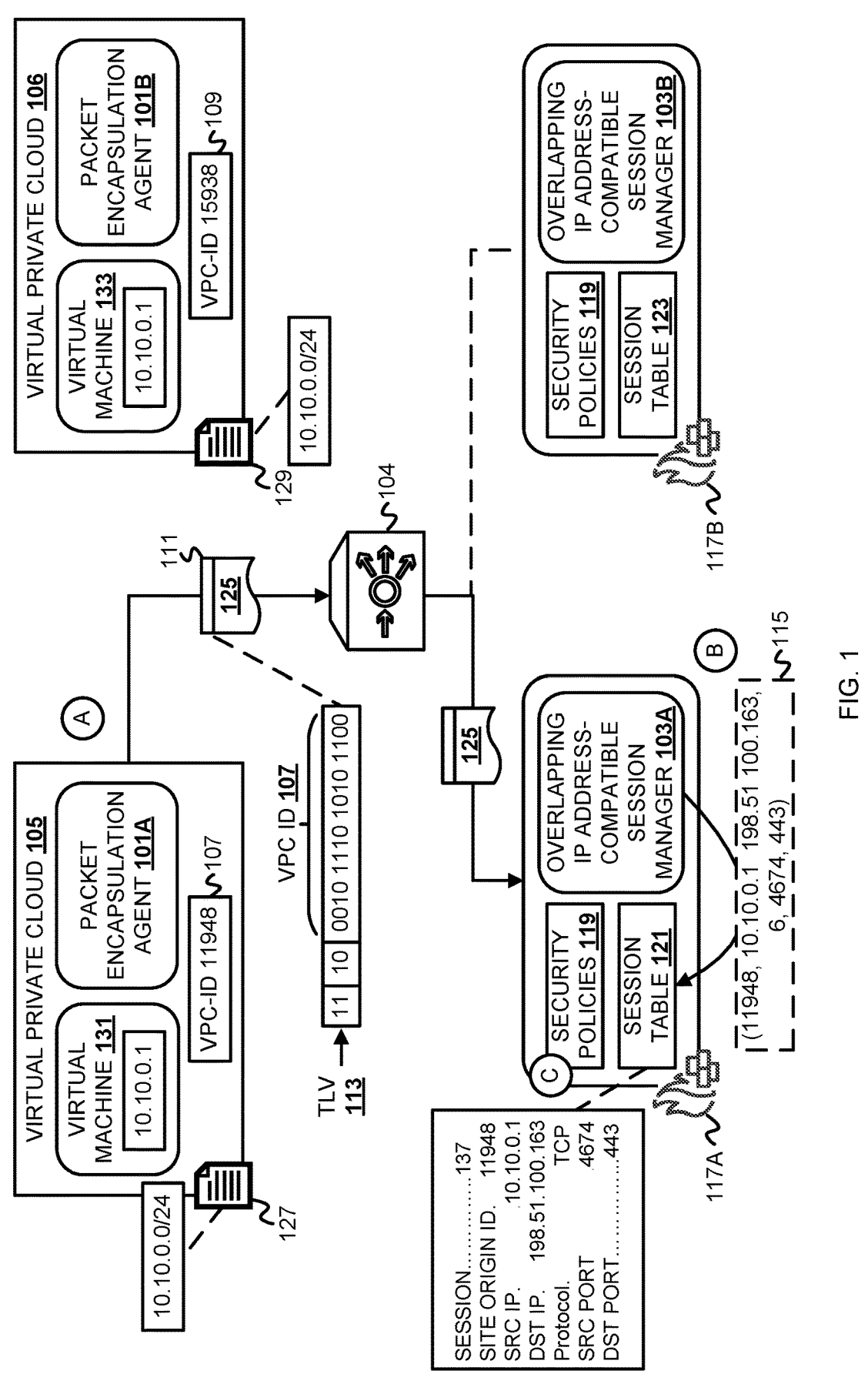
FIGS. 1 and 2 are conceptual diagrams of scalable communication of uniquely identifying information of network traffic sources between entities for differentiation of flows corresponding to an overlapping IP address.

The description that follows includes example systems, methods, techniques, and program flows to aid in understanding the disclosure and not to limit claim scope. Well-known instruction instances, protocols, structures, and techniques have not been shown in detail for conciseness.

Terminology

This description uses shorthand terms related to cloud technology for efficiency and ease of explanation. When referring to "a cloud," this description is referring to the resources of a cloud service provider (CSP). For instance, a cloud can encompass the servers, virtual machines, and storage devices of a CSP. In more general terms, a CSP resource accessible to customers is a resource owned/managed by the CSP entity that is accessible via network connections. Often, the access is in accordance with an application programming interface (API) or software development kit provided by the CSP.

This description uses the term "flow" in reference to sequences of packets sent between a source and a destination. A flow is defined by an N-tuple, where N is a nonzero whole number, that comprises properties of packets so that packets can be matched to flows based on their properties. Packets that are part of the same flow share an N-tuple or transposed N-tuple. Properties that are included in the N-tuple of a flow can vary by protocol.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

While solutions to distinguish between devices with overlapping IP addresses do exist, scalability of these solutions poses an additional challenge. For instance, in networks where devices in different subnets, such as those created for branches of an organization or virtual private clouds (VPCs), have an overlapping IP address, zones and/or interfaces (e.g., tunnel interfaces) can be utilized to uniquely identify the branch or VPC to which network traffic destined to/from the overlapping IP address corresponds. However, doing so involves preconfiguring each worker that processes traffic in the network (e.g., each firewall processing load balanced network traffic) with the zones and interfaces defined for the network. In large-scale networks, such as distributed enterprise networks, the number of VPCs/branches that may have a unique zone/interface defined can reach the thousands or millions, so preconfiguring all workers with all zones/interfaces defined for the network is not feasible due to memory limitations. Another solution involves designating a worker node for a set of VPCs/branches, though this introduces a strong coupling between senders and receivers in the network and further is not possible in a cloud environment when loud balancers are used to load balance across workers.

Disclosed herein are scalable techniques for distinguishing flows corresponding to an overlapping IP address and managing corresponding sessions for appropriately enforcing security policies without out-of-band configuration of zones/interfaces within a network. A network comprises a plurality of sites, which may be logical sites such as VPCs or physical sites such as branch offices with respective subnets, and a security appliance(s) that inspects network traffic sent to/from the sites. Agents deployed to each site encapsulate outbound packets with a header that includes an identifier that uniquely identifies the site as the origin of the packets. Examples of the unique identifiers of the sites include VPC identifiers assigned to VPCs by a CSP or branch identifiers assigned to network elements by a network controller that manages network elements (e.g., a software-defined wide area network (SD-WAN) controller). Upon receipt by a security appliance of one or more packets encapsulated with a header that includes this "origin identifier," an overlapping IP address-compatible session manager (hereinafter simply "session manager") executing on the security appliance obtains the origin identifier and other attributes of the packets that identify the flow to which the packets correspond, including source/destination IP addresses, source/destination ports, and protocol. The session manager determines an N-tuple that at least comprises a 6-tuple formed by the origin identifier and packet attributes. The session manager creates a session for the flow with the N-tuple as the session key, and the security appliance can then enforce a security policy for the packets based on inspecting the packets and applying rules of the security policy accordingly. Subsequent packets that are part of the flow match to the created session and can be handled as specified by the security policy accordingly. Flows corresponding to an overlapping IP address can thus be distinguished by their associated origin identifier and are correctly treated as different flows for the purpose of security policy enforcement. Encapsulation of packets with a header that indicates a unique identifier of their origin is based on dynamic determination of origin identifiers rather than relying on the configuration of any components in the network with identifying information for all possible origins, thus providing scalability unhindered by resource limitations of network components.

Example Illustrations

Figure 2:
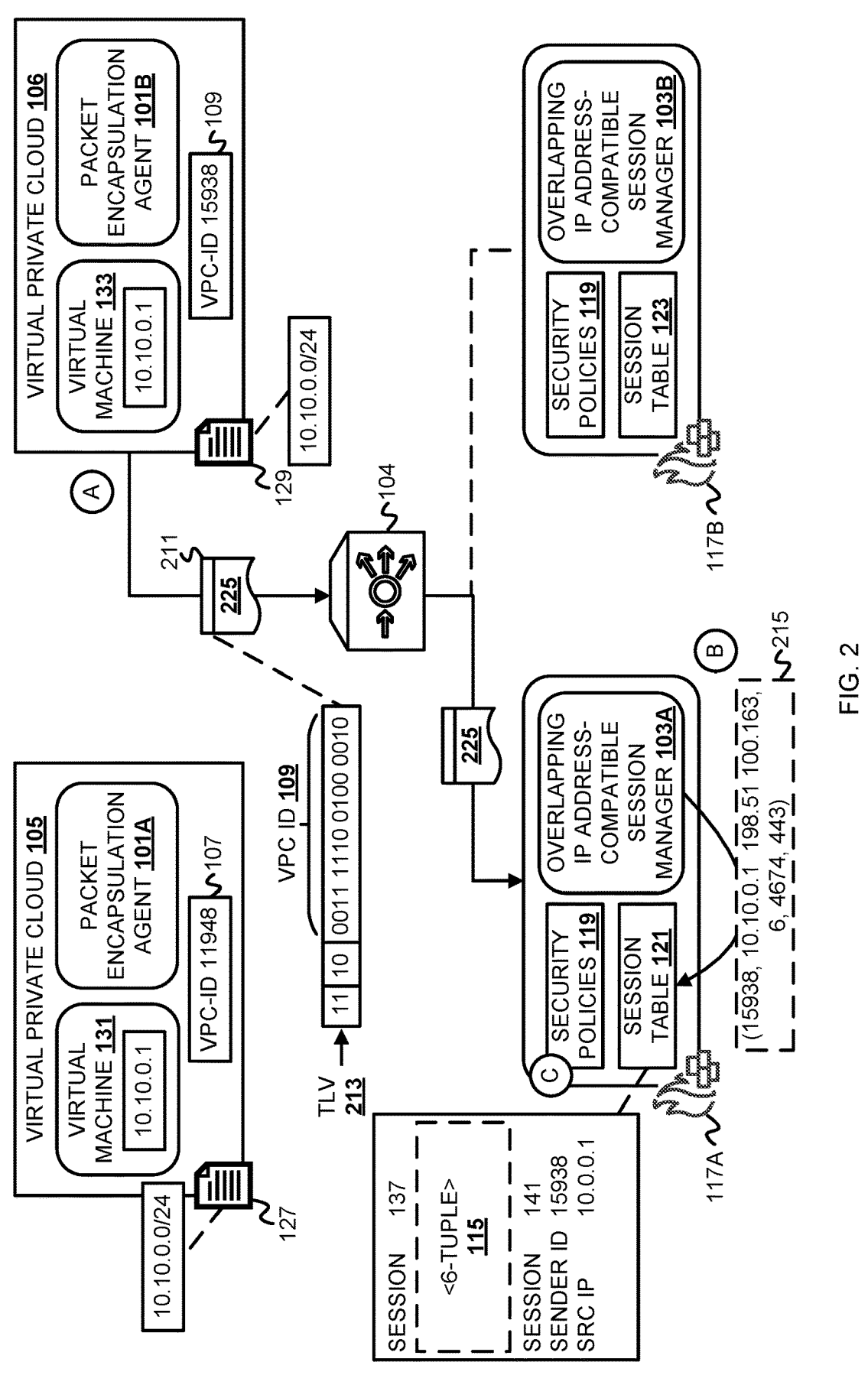

FIGS. 1 and 2 are conceptual diagrams of scalable communication of uniquely identifying information of network traffic sources between entities for differentiation of flows corresponding to an overlapping IP address. A virtual machine 131 is hosted in a VPC 105. A virtual machine 133 is hosted in a VPC 106. The VPCs 105, 106 have been allocated for a tenant, which may be an organization. A configuration file 127 of the VPC 105 indicates that the VPC 105 has been configured with a subnet comprising IP addresses within the address block 10.10.0.0/24. A configuration file 129 of the VPC 106 indicates that the VPC 106 has also been configured with a subnet comprising IP addresses within the address block 10.10.0.0/24. The virtual machine 131 and the virtual machine 133 have been allocated an overlapping IP address within this address block, which in this example is 10.10.0.1. Network traffic of the VPCs 105, 106 is sent to a load balancer 104 that load balances network traffic across security appliances, which are firewalls in this example that at least include firewalls 117A-B. The firewalls 117A-B each have security policies 119 installed thereon. The firewall 117A maintains a session table 121, and the firewall 117B maintains a session table 123. The load balancer 104 can implement session persistence such that it identifies packets sent as part of a same session and forwards these packets to the same one of the firewalls 117A-B for the duration of the session.

Respective instances of a packet encapsulation agent, depicted as packet encapsulation agents ("agents") 101A-B, execute on the VPCs 105, 106. The agents 101A-B monitor for outbound packets of the VPCs 105, 106. For instance, each of the agents 101A-B may monitor for and intercept packets destined for an Internet gateway (not depicted in FIGS. 1-2) attached to the respective one of the VPCs 105, 106. The agents 101A-B encapsulate the outbound packets with a header that comprises a unique identifier of the network traffic origin to which they are deployed, which in this example are the VPCs 105, 106. The unique identifiers in this example are VPC identifiers, which may be assigned by the CSP that provisioned the VPCs 105, 106. As depicted in FIGS. 1-2, the VPC 105 is associated with a VPC identifier 107, and the VPC 106 is associated with a VPC identifier 109. The VPC identifiers 107, 109 are depicted as maintained at their respective VPCs in this example for clarity and to aid in illustration, though in implementations, the VPC identifiers 107, 109 may be maintained by the CSP, such as in a database storing data of cloud resources provisioned to the tenant. Respective instances of an overlapping IP address-compatible session manager, depicted as overlapping IP address-compatible session managers ("session managers") 103A-B, execute on the firewalls 117A-B. The session managers 103A-B identify the origin and attributes of packets passed to the respective one of the firewalls 117A-B by the load balancer 104 for creation/identification of corresponding sessions.

FIGS. 1 and 2 are each annotated with a series of letters A-C. Each letter represents a stage of one or more operations. Although these stages are ordered for this example, the stages illustrate one example to aid in understanding this disclosure and should not be used to limit the claims. Subject matter falling within the scope of the claims can vary from what is illustrated.

FIG. 1, which is now described, depicts creation of a session that mitigates the issues traditionally associated with techniques for differentiating between flows and managing sessions corresponding to an overlapping IP address. Differentiation of flows corresponding to an overlapping IP address when a session for a flow comprising the overlapping IP address has already been established is depicted in FIG. 2 and described later.

At stage A, the virtual machine 131 sends an outbound packet 125 that the agent 101A encapsulates with a header 111 comprising the VPC identifier 107. The agent 101A intercepts the packet 125 and encapsulates the packet 125 with the header 111 that includes the VPC identifier 107, which is depicted as "11948" in this example. The agent 101A can dynamically determine the VPC identifier 107; in other words, the agent 101A may not be preconfigured with the VPC identifier 107. The agent 101A can, for instance, submit to the CSP that owns/manages the VPC 105 a request for an identifier of the VPC to which it is deployed via an API of the CSP and obtain the VPC identifier 107 in response. Determination of the VPC identifier 107 may have occurred previously (e.g., at the time the agent 101A was deployed to the VPC 105) or may be triggered based on the agent 101A detecting a first outbound packet. The agent 101A incorporates the VPC identifier 107 in a type-length-value (TLV) element 113 of the header 111. The header 111 may be, for instance, a header according to the Generic Network Virtualization Encapsulation (GENEVE) packet format, where the VPC identifier 107 is included in a TLV element of the GENEVE header options. The TLV element 113 in this example comprises an exemplary type field having a value of 11, an exemplary length field having a value of 10 (i.e., two bytes), and a value field comprising a binary representation of the VPC identifier 107. The packet 125 can be forwarded towards the firewalls 117A-B for inspection after encapsulation with the header 111.

At stage B, after the load balancer 104 passes the packet 125 to the firewall 117A according to a load balancing algorithm that it implements, the firewall 117A begins processing the packet 125. The session manager 103A obtains the VPC identifier 107 from the header 111. The session manager 103A may have been preconfigured with an indication of the header field (i.e., the respective TLV element in this example) from which to read identifiers of packet origins. The session manager 103A also determines other attributes of the packet 125 based on its header(s), such as a header corresponding to a lower protocol layer. Packet attributes that the session manager 103A determines include those used to perform session lookups in the session table 121. In this example, the other packet attributes include source/destination IP addresses, source/destination ports, and protocol. The session manager 103A creates a 6-tuple 115 that comprises the VPC identifier 107 and these attributes of the packet 125. The 6-tuple 115 in this example is (11948, 10.10.0.1, 198.51.100.163, 6, 4674, 443), with the order of elements being (VPC identifier, source IP address, destination IP address, protocol, source port, destination port), though ordering of elements in 6-tuples can vary in implementations. The session manager 103A performs a lookup in the session table 121 with the 6-tuple 115 to determine if the packet 125 can be matched to a session being tracked by the firewall 117A. This example assumes that there is no match to a session tracked in the session table 121, so the session manager 103A creates a session 137 in the session table 121 that is identifiable by the 6-tuple 115. In other words, performing a lookup in the session table 121 with the 6-tuple 115 yields information about the session 137.

At stage C, the firewall 117A inspects the packet 125 and enforces the security policies 119 accordingly. The security policies 119 may be implemented with rules such that the firewall 117A applies one or more of the rules of the security policies 119 to the packet 125 and subsequent packets that belong to the same flow as the packet 125 and thus match to the session 137. Upon receipt of subsequent packets of this flow identified by the 6-tuple, subsequent lookups in the session table 121 for the 6-tuple or its transposition will yield a match to the session 137, and the firewall 117A can apply the corresponding rule(s) of the security policies 119 to the packets accordingly.

FIG. 2 depicts the session table 121 as already comprising the session 137 identifiable by the 6-tuple 115. The session 137 is assumed to have been maintained in the session table 121 in this example, with the firewall 117A applying one or more rules of the security policies 119 to packets of the flow matching to the session 137.

At stage A, the virtual machine 133 sends an outbound packet 225 that the agent 101B encapsulates with a header 211 comprising the VPC identifier 109. The agent 101B intercepts the packet 225 and attaches the header 211 that includes the VPC identifier 109, which is depicted as "15938" in this example. As described in reference to FIG. 1, the agent 101B can dynamically determine the VPC identifier 109, such as by submitting to the CSP a request for an identifier of the VPC to which it is deployed via an API of the CSP and obtain the VPC identifier 109 in response. The agent 101B incorporates the VPC identifier 109 in a TLV element 213 of the header 211. The header 211 may be a GENEVE header, where the VPC identifier 109 is included in a TLV element of GENEVE header options. The TLV element 213 in this example comprises an exemplary type field having a value of 11, an exemplary length field having a value of 10, and a value field comprising a binary representation of the VPC identifier 109. The packet 225 can be forwarded towards the firewalls 117A-B for inspection after encapsulation with the header 211.

At stage B, after the load balancer 104 passes the packet 225 to the firewall 117A according to a load balancing algorithm that it implements, the firewall 117A begins processing the packet 225. The session manager 103A obtains the VPC identifier 109 from the header 211. The session manager 103A also determines other attributes of the packet 225 based on its header(s), such as a header corresponding to a lower layer protocol. The other attributes are the same as those described above in reference to FIG. 1. The session manager 103A creates a 6-tuple 215 that comprises the VPC identifier 109 and the attributes of the packet 225, which are depicted as having the same values as the attributes of the packet 125 of FIG. 1. To illustrate, the 6-tuple 215 in this example is (15938, 10.10.0.1, 198.51.100.163, 6, 4674, 443). The 6-tuples 115, 215 thus comprise an overlapping IP address (i.e., the source IP address 10.10.0.1) but are differentiated by the VPC identifier included therein. The session manager 103A performs a lookup in the session table 121 with the 6-tuple 215 to determine if the packet 225 can be matched to a session tracked by the firewall 117A in the session table 121. This example assumes that there is no match to a session, so the session manager 103A creates a session 141 in the session table 121 that is identifiable by the 6-tuple 215.

At stage C, the firewall 117A inspects the packet 225 and enforces the security policies 119 accordingly. As described above, the firewall 117A applies one or more of the rules of the security policies 119 to the packet 225. Upon receipt of subsequent packets of this flow identified by the 6-tuple 215, subsequent lookups in the session table 121 by the session manager 103A for the 6-tuple 215 or its transposition (i.e., based on detection of network traffic traveling in the opposite direction) will yield a match to the session 141, and the firewall 117A can apply the corresponding rule(s) of the security policies 119 to the packets accordingly.

Typically, upon receipt of a packet associated with an overlapping IP address, a session lookup with an N-tuple such as a conventional 5-tuple when an existing session has been created for the overlapping IP address has the potential to yield a result that the session already exists. In other words, without the VPC identifiers 107, 109 included in the 6-tuples 115, 215, the session lookup performed for the packet 225 would yield a match to the session 137 despite this packet originating from a different VPC. The packet 225 would thus be handled according to the rule(s) of the security policies 119 being applied for the session 137 rather than the packet 225 being treated as part of a separate flow that is potentially subject to a different rule(s) of the security policies 119. To illustrate, based on results of inspection of each of the packets 125, 225, the firewall 117A can apply a first rule of the security policies 119 to the packet 125 and any subsequent packets of the session 137 and a second rule of the security policies 119 to the packet 225 and any subsequent packets of the session 141. As an example, in implementations where the firewalls 117A-B comprise application identification capabilities, the packet 125 may comprise a request to perform a first action or access a first resource of an application that is allowed by the security policies 119, while the packet 225 may comprise a request to perform a second action or access a second resource of the application that is forbidden by the security policies 119. The inclusion of unique identifiers of network traffic origins in packet headers as depicted in FIGS. 1-2 thus provides for the differentiation of packets indicating an overlapping IP address into respective flows so that security policies can be enforced appropriately for each flow.

As depicted and described above, flows defined by their 6-tuple are considered to be bidirectional. In other words, a 6-tuple defining a flow that is reflected in a session table encompasses packets traveling in both directions, and a packet will be matched to the flow's session if its 6-tuple or transposed 6-tuple match to the session. In implementations, however, flows may be defined unidirectionally. To illustrate, with reference to FIGS. 1 and 2, as each of the session managers 103A-B identify packet attributes and VPC identifiers, the respective session manager can add a 6-tuple and its transposition to the respective one of the session tables 121, 123 when the session is created. Functionality differs from that described above in that a session table lookup when flows are considered bidirectional can include a 6-tuple and transposed 6-tuple, while a session table lookup when flows that are considered unidirectional can include one of the 6-tuple or transposed 6-tuple depending on the direction of network traffic. Additionally, any return traffic processed by the firewalls 117A-B that is inbound should include the same origin identifier that was included in the respective outbound packet(s) (the VPC identifier in which example). The session managers 103A-B can thus identify the origin identifier in return traffic and match the inbound packets to the correct one of the sessions in their session tables.

FIGS. 3 and 4 are flowcharts of example operations. The example operations are described with reference to a packet encapsulation agent and an overlapping IP address-compatible session manager (hereinafter "the agent" and "the session manager," respectively) for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

The example operations refer to an "origin" or "origin network" of a packet. Types of packet origins/origin networks can vary among implementations but generally refer to physical or logical sites of a network (e.g., that of an organization) that correspond to respective subnets and encompass one or more physical and/or virtual devices with a network connection. Examples of packet origins/origin networks include sites of an organization connected to an SD-WAN (e.g., branch networks) and VPCs allocated within a cloud environment of an organization.

FIG. 3 is a flowchart of example operations for attaching unique identifiers of network traffic origins to packets to facilitate differentiation of flows that correspond to an overlapping IP address. The example operations assume that instances of the agent are deployed to each origin of network traffic of an organization. For example, when the example operations are implemented for an SD-WAN, an instance of the agent can execute on each SD-WAN router deployed to sites of the SD-WAN. As another example, when the example operations are implemented for a cloud environment comprising one or more VPCs, an instance of the agent can be deployed to each VPC. The example operations that are depicted can be performed by each agent that monitors a respective network traffic origin of the organization.

At block 301, the agent detects one or more outbound packets that originate from the monitored network traffic origin. For implementations where the agent is deployed to a VPC, the agent can intercept outbound packets directed to an Internet gateway that is attached to the VPC. For implementations where the agent is deployed to a router, the agent can intercept packets that are destined for an external network via the router, such as by monitoring a tunnel interface of the router.

At block 303, the agent determines a unique identifier of the network traffic origin. Types of the unique identifier can vary by type of origin networks. If the packets are the first outbound packets that the agent has detected since its deployment to monitor network traffic of the origin, the agent can retrieve the identifier from a managing entity of the network. For implementations where the agent is deployed to a VPC, the agent can query the CSP that provides the VPC (e.g., via an API of the CSP) for the identifier it has allocated to the VPC. The identifier in this case identifies the VPC as the origin network of the packets. For implementations where the agent is deployed to a router, the agent can query a network controller that manages routers of the network (e.g., an SD-WAN controller) for the identifier of the site to which the router corresponds, such as a branch identifier allocated to the router. The identifier in this case identifies the network corresponding to the router (e.g., the branch network) as the origin network of the packets. The agent can store the identifier locally upon retrieval so that determination of the identifier for subsequent packets can be performed locally. Thus, if the agent has previously determined the identifier based on a prior detected packet(s), the agent can determine the locally stored identifier.

At block 305, the agent encapsulates each of the one or more packets with a header that includes a TLV element comprising the identifier. The packets may have already been encapsulated with one or more headers corresponding to another (e.g., a lower) protocol layer before further processing and encapsulation by the agent. The agent may include the identifier in option data of a GENEVE header with which it encapsulates each packet, where the value element of the option TLV comprises the identifier. The agent may be preconfigured with a binary code to be included in the type field of the TLV that is recognized as designating that the TLV corresponds to an origin identifier.

At block 307, the agent forwards the encapsulated packets towards their destination. After the agent has encapsulated the packets, additional processing of the packets may be performed according to the protocol according to which the packets are being sent.

FIG. 4 is a flowchart of example operations for performing overlapping IP address-compatible session creation for security policy enforcement. The example operations of FIG. 4 can be ongoing as long as a security appliance on which the session manager executes is active. FIG. 4 also depicts blocks 411, 413, and 415 with dashed lines to denote that these operations are performed by the security appliance. Though security appliances may perform other operations to establish and maintain sessions (e.g., maintaining/ updating session states), such operations are not depicted in this example for clarity.

At block 401, the session manager detects one or more packets. The packets may have been directed to the security appliance on which the session manager executes via a load balancer or may have been sent directly to the security appliance.

At block 403, the session manager determines an identifier of the origin of the packets based on packet headers. The session manager determines the identifier based on a corresponding field(s) of a header with which each of the packets was encapsulated (e.g., a tunnel header). For instance, the header may be a GENEVE header with an option comprising a TLV element with the identifier in the value field. The session manager may have been preconfigured with an indication of the field(s) in which origin identifiers are included, such as the value included in a TLV type field to indicate that the TLV corresponds to an origin identifier.

At block 405, the session manager creates an N-tuple of the flow to which the packet corresponds based on the determined identifier and other attributes of the packet(s). Other attributes of the packet at least include source/destination IP addresses, an indication of a protocol, and source/destination ports. The N-tuple at least comprises a 6-tuple that includes the origin identifier determined at block 403 and the source/destination IP addresses, indication of the protocol, and source/destination ports. Ordering of the identifier and other attributes in N-tuples created by the session manager can vary among implementations.

At block 407, the session manager determines if the N-tuple matches to a session in the security appliance's session table. The security appliance maintains a session table that is accessible to the session manager and comprises information about one or more sessions. Sessions maintained in the session table are identified by respective N-tuples, each of which denotes attributes of a flow and a unique identifier of the origin of the packets of the flow. N-tuples serve as keys of the session table by which session information can be retrieved. The session manager performs a lookup in the session table with the N-tuple corresponding to the packets. The load balancer should send packets that are part of the same session to the same security appliance (e.g., based on session persistence), so a session should be recorded in the security appliance's session table if the security appliance has previously handled packets that are part of the flow to which the packet(s) correspond. If the N-tuple does not match to a session in the session table, operations continue at block 409. Otherwise, if the N-tuple matches to a session in the session table, operations continue at block 413.

At block 409, the session manager creates a new session table entry for the session that is identifiable by the N-tuple. The session table entry indicates the identifier of the origin of packets corresponding to the session and the additional attributes of the packets that identify their flow. The session manager creates the session table entry such that the N-tuple can subsequently be used as a key to retrieve information about the session. The session manager may also assign a unique session identifier to the session and include this session identifier in the session table entry.

At block 411, at least a first rule of the security policy that are applicable to the packets is determined. The security appliance enforces a security policy that can be implemented with a plurality of rules installed thereon. The security appliance examines the packets to determine the rule of the security policy to apply to the packets.

At block 413, the packets are handled according to the rule(s) of the security policy that is applicable to the session. For instance, the security appliance may allow or block the packets as designated by the security policy rule. Operations continue at block 401 when the session manager detects one or more subsequent packets.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
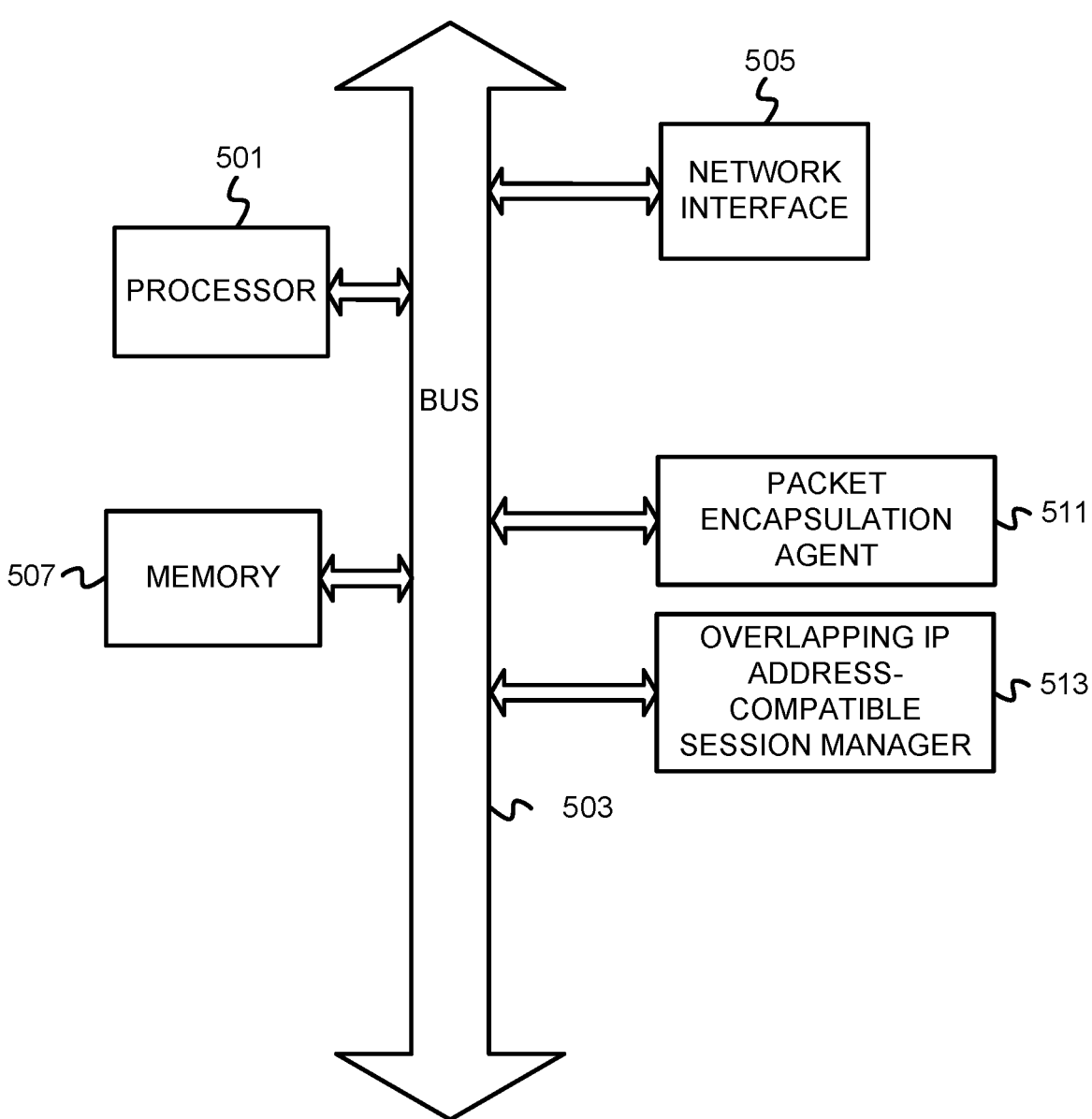
FIG. 5 depicts an example computer system with a packet encapsulation agent and an overlapping IP address-compatible session manager.

FIG. 5 depicts an example computer system with a packet encapsulation agent and an overlapping IP address-compatible session manager. The computer system includes a processor 501 (possibly including multiple processors, multiple cores, multiple nodes, and/or implementing multithreading, etc.). The computer system includes memory 507. The memory 507 may be system memory or any one or more of the above already described possible realizations of machine-readable media. The computer system also includes a bus 503 and a network interface 505. The system also includes packet encapsulation agent 511 and overlapping IP address-compatible session manager 513. The packet encapsulation agent 511 encapsulates outbound packets with an identifier that uniquely identifies the origin of the packet (e.g., a VPC identifier or a branch/site identifier). The overlapping IP address-compatible session manager 513 creates sessions identifiable by N-tuples (e.g., 6-tuples) comprising identifiers that uniquely identify origins of the network traffic corresponding to each session, where sessions corresponding to overlapping IP addresses can be distinguished by their respective origin identifiers. While depicted as part of the same computer system in FIG. 5 for ease of illustration, the packet encapsulation agent 511 and overlapping IP address-compatible session manager 513 do not necessarily execute as part of the same system. For instance, the packet encapsulation agent 511 and overlapping IP address-compatible session manager 513 may execute as part of different network elements (e.g., a router and a firewall). Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

The invention claimed is:

1. A method comprising:

based on a security appliance receiving a first packet, determining a first plurality of attributes of the first packet and a first identifier indicated in a header of the first packet, wherein the first identifier identifies an origin of the first packet;

creating a first session that is identifiable by a first tuple comprising a first 6-tuple, wherein the first 6-tuple comprises the first identifier and the first plurality of attributes;

applying a first rule of a security policy to the first packet and subsequent packets that match to the first session;

based on the security appliance receiving a second packet, determining a second plurality of attributes of the second packet and a second identifier indicated in a header of the second packet, wherein the second identifier identifies an origin of the second packet, wherein the first packet and the second packet have an overlapping Internet Protocol (IP) address as a source address, wherein the first identifier and the second identifier are different;

creating a second session that is identifiable by a second tuple comprising a second 6-tuple, wherein the second 6-tuple comprises the second identifier and the second plurality of attributes; and applying a second rule of the security policy to the second packet and subsequent packets that match to the second session.

2. The method of claim 1, wherein determining the first plurality of attributes comprises determining the source address, a first destination address, a first source port, a first destination port, and a first indication of a protocol for first packet, and wherein determining the second plurality of attributes comprises determining the source address, a second destination address, a second source port, a second destination port, and a second indication of a protocol for the second packet.

3. The method of claim 1, wherein the origin of the first packet is a first virtual private cloud (VPC) and the origin of the second packet is a second VPC, and wherein the first and second identifiers are identifiers of the first and second VPCs.

4. The method of claim 1, wherein the origin of the first packet is a network site associated with a first network element and the origin of the second packet is a network site associated with a second network element, and wherein the first and second identifiers are identifiers assigned to the first and second network elements.

5. The method of claim 1, wherein applying the first rule of the security policy to the subsequent packets of the first session comprises, determining an identifier of the subsequent packets and attributes of the subsequent packets, wherein the identifier is the first identifier;

matching a tuple comprising the first identifier and the attributes to the first session, wherein the tuple matches the first tuple; and applying the first rule of the security policy to the subsequent packets.

6. The method of claim 1, wherein determining the first identifier the first packet comprises determining the first identifier from a first type-length-value (TLV) element of the header of the first packet, and wherein determining the second identifier comprises determining the second identifier from a second TLV element of the header of the second packet.

7. The method of claim 6, wherein the header of each of the first and second packets comprises a Generic Network Virtualization Encapsulation (GENEVE) header.

8. The method of claim 1, wherein the first and second plurality of attributes are the same.

9. The method of claim 1, wherein creating the first session that is identifiable by the first tuple comprising the first 6-tuple comprises updating a session table with an entry that comprises the first tuple, wherein the first tuple is a key for the first session in the session table.

10. One or more non-transitory machine-readable media having program code stored thereon, the program code comprising instructions to:

detect a first packet corresponding to a first flow and a second packet corresponding to a second flow, wherein the first packet comprises a first header and the second packet comprises a second header;

determine a first identifier indicated the first header, wherein the first identifier identifies a first network from which the first packet originated;

determine a second identifier indicated in the second header, wherein the second header identifies a second network from which the second packet originated, wherein the first and second identifiers are different, wherein the first packet and the second packet indicate an overlapping Internet Protocol (IP) address as a source IP address;

based on a determination of a first tuple comprising a first 6-tuple that includes the first identifier and attributes of the first packet, create a first session identified by the first tuple;

based on a determination of a second tuple comprising a second 6-tuple that includes the second identifier and attributes of the second packet, create a second session identified by the second tuple; and apply a first security policy rule to the first packet and packets of the first flow that match to the first session and a second security policy rule to the second packet and packets of the second flow that match to the second session.

11. The non-transitory machine-readable media of claim 10, wherein the attributes of each of the first and second packets comprise the source IP address, a destination IP address, a source port, a destination port, and an indication of a protocol.

12. The non-transitory machine-readable media of claim 10, wherein the instructions to apply the first security policy rule to packets of the first flow comprise instructions to, based on detection of a subsequent packet corresponding to the first flow, determine an identifier indicated in a header of the subsequent packet, wherein the identifier is the first identifier, wherein the subsequent packet also indicates the source IP address;

determine a third tuple that comprises the identifier and attributes of the subsequent packet;

determine whether the third tuple matches to a created session; and based on a determination that the third tuple matches to the first session in the created sessions, apply the first security policy rule to the subsequent packet.

13. The non-transitory machine-readable media of claim 10, wherein the instructions to determine the first identifier comprise instructions to determine the first identifier from a first type-length-value (TLV) element of the first header, and wherein the instructions to determine the second identifier comprise instructions to determine the second identifier from a second TLV element of the second header.

14. The non-transitory machine-readable media of claim 13, wherein the first and second headers comprise first and second Generic Network Virtualization Encapsulation (GE-NEVE) headers, wherein the first GENEVE header comprises the first TLV element, and wherein the second GENEVE header comprises the second TLV element.

15. An apparatus comprising:

a processor; and a machine-readable medium having instructions stored thereon that are executable by the processor to cause the apparatus to, based on detection of a first packet, determine a first plurality of attributes of the first packet and a first identifier indicated in a header of the first packet, wherein the first identifier identifies a first origin network;

create a first session that is identifiable by a first tuple that comprises a first 6-tuple, wherein the first 6-tuple comprises the first identifier and the first plurality of attributes;

apply a first rule of a security policy to the first packet and subsequent packets that match to the first session;

based on detection of a second packet, determine a second plurality of attributes of the second packet and a second identifier indicated in a header of the second packet, wherein the second identifier identifies a second origin network, wherein the first packet and the second packet have a first overlapping Internet Protocol (IP) address as a source address, wherein the first identifier and the second identifier are different;

create a second session that is identifiable by a second tuple that comprises a second 6-tuple, wherein the second 6-tuple comprises the second identifier and the second plurality of attributes; and apply a second rule of the security policy to the second packet and subsequent packets that match to the second session.

16. The apparatus of claim 15, wherein the instructions executable by the processor to cause the apparatus to determine the first plurality of attributes comprise instructions executable by the processor to cause the apparatus to determine the source address, a first destination address, a first source port, a first destination port, and a first indication of a protocol for first packet, wherein the instructions executable by the processor to cause the apparatus to determine the second plurality of attributes comprise instructions executable by the processor to cause the apparatus to determine the source address, a second destination address, a second source port, a second destination port, and a second indication of a protocol for the second packet.

17. The apparatus of claim 15, wherein the instructions executable by the processor to cause the apparatus to apply the first rule of the security policy to the subsequent packets that match to the first session comprise instructions executable by the processor to cause the apparatus to, for each of the subsequent packets, determine an identifier indicated in a header of the subsequent packet, wherein the identifier is the first identifier, wherein the subsequent packet also indicates the source address;

determine a third tuple that comprises the identifier and attributes of the subsequent packet;

determine whether the third tuple matches to a created session; and based on a determination that the third tuple matches to the first session in the created sessions, apply the first rule to the subsequent packet.

18. The apparatus of claim 15, wherein the instructions executable by the processor to cause the apparatus to determine the first identifier the first packet comprise instructions executable by the processor to cause the apparatus to determine the first identifier from a first type-length-value (TLV) element of the header of the first packet, wherein the instructions executable by the processor to cause the apparatus to determine the second identifier comprise instructions executable by the processor to cause the apparatus to determine the second identifier from a second TLV element of the header of the second packet.

19. The apparatus of claim 18, wherein the header of the first packet comprises a first Generic Network Virtualization Encapsulation (GENEVE) header and the header of the second packet comprises a second GENEVE header, wherein the first GENEVE header comprises the first TLV element, and wherein the second GENEVE header comprises the second TLV element.

20. The apparatus of claim 15, wherein the first origin network comprises a first subnet, wherein the second origin network comprises a second subnet, and wherein the first overlapping IP address is an overlapping IP address for the first and second subnets.

\* \* \* \* \*